United States Patent Office 3,399,067
Patented Aug. 27, 1968

3,399,067
PRECISION CASTING
Robert K. Scott, Pittsburgh, Pa., assignor to Dresser Industries, Inc., Dallas, Tex., a corporation of Delaware
No Drawing. Filed Nov. 29, 1965, Ser. No. 528,317
2 Claims. (Cl. 106—38.3)

ABSTRACT OF THE DISCLOSURE

In methods for preparing molds for precision casting from batches of refractory grain and prehydrolized alkyl silicate binder, the refractory grain is selected from calcined natural high alumina materials and zircon and South American bauxite is present to provide sufficient free $Al_2O_3$ to react with free $SiO_2$ present to form mullite.

---

Precision castings of metal and other types of material cast in the molten state are used in many industries and, generally, such castings are made in expendable molds. There are three general types of processes for making the expendable molds, and these may be classified as the ceramic shell, the single investment and the double investment processes. To provide an economical process, a master mold or pattern is initially prepared, from which a plurality of the one-time use refractory molds are made by one of the above processes. The materials for preparing such molds generally include a refractory and a binder. The art of preparing these materials for the molds has heretofore required precision techniques and highly trained personnel in the art of mixing the materials and preparing the expendable molds.

One conventional method of fabricating the refractory molds has been to prepare a hardenable refractory mixture from a blend of an investment binder, such as, colloidal silica, or various lower alkyl silicates, (i.e., ethyl silicate) water, plasticizers, catalyzers, gelling agents, and finely divided refractory aggregates. Prior practices have required considerable care in preparation of the binder mixture and the selection of a refractory aggregate in order to prevent premature gellation and setting of the mixture. Also, in some instances when improper handling and mixing techniques were used, considerable difficulty was encountered in removing the refractory form or sheet from the solidified metal casting. Particularly in the manufacture of such as aircraft jet engine turbine blades and buckets, even very minor imperfections are unacceptable and a casting having them is not usable.

A particularly annoying problem recently discovered in the field was that in the casting of iron and base alloys thereof in molds bonded with silicate binders, the molten metal reacted with the refractory precision molds causing sticking and roughening of the cast surfaces. This molten metal reaction was caused by free silica in the mold which became liquid at the pouring temperature of the metal. The free silica was contributed predominantly by the silicate binder and a small amount by the refractory aggregate employed.

It has been proposed to use binders containing reduced amounts of free silica; however, this has not completely alleviated the difficulties. Further, silica in the binder is desirable to provide high strength in the precision casting molds.

Accordingly, it has been discovered, and it is upon this that the invention is largely predicated, that the refractory materials used in these molding media whose selection was considered relatively unimportant in the past, must be judiciously selected to provide a ceramic mold that will not react with the molten metal upon pouring. This requires the elimination of compounds within the molds that will form a liquid at the metal pouring temperature, which is generally above 2500° F.

Accordingly, it is an object of this invention to provide an improved mold which will not react with molten metal contained therein.

It is another object of the invention to provide a molding composition for the fabrication of an expendable mold.

It is till another object of this invention to provide an improved refractory mold for use in investment and shell molding techniques, which mold is easily and rapidly removed from a cast shape with little danger of damage to or imperfections in a cast part.

Other objects of the invention will become apparent hereinafter.

In accordance with the present invention, an expendable, readily removed, precision casting mold is provided. Such molds are fabricated from a mixture including a specifically selected finely divided refractory aggregate and a prehydrolized alkyl silicate binder. The refractory aggregate in the batch is either a calcined high alumina material, such as, sillimanite or mullite, or zircon. By high alumina material, I mean one analyzing at least 50% $Al_2O_3$, by weight, on an oxide basis.

The batch also contains as an essential ingredient free alumina, preferably as corundum, in an amount sufficient to combine with all of the free silica in the batch as mullite ($3Al_2O_3 \cdot 2SiO_2$). The ratio of free alumina to free silica in the batch preferably ranges between 3 and 6 to 1.

In molding media utilizing high alumina materials, such as calcined South American bauxite as the refractory aggregate, which analyzes about 89% $Al_2O_3$, on an oxide basis, sufficient free alumina may be present therein to combine with all of the free silica in the mix, depending upon the amount of silica in the binder. However, if sufficient free alumina is not present in the aggregate, materials such as calcined alumina, crude bauxite, calcined bauxite and the like are added to provide the balance.

Zircon is usually balanced in that it contains little, if any, free silica or free zirconia. Therefore, where zircon is employed as a refractory aggregate, free alumina must, of course, be added to the batch generally only to combine with the free silica introduced in the binder solution or other additives.

The batch may also contain a plasticizer or a gelling agent depending upon whether the batch is to be used for shell molding or investment molding respectively.

In ceramic shell molding processes, generally, a master pattern is immersed in a slurry consisting of a finely divided refractory aggregate (i.e., 200 mesh) and binder to provide a relatively thin coating thereon which later acts as a facing for the metal to be cast. Afterwards, the coated pattern is dipped in a fluidized bed of a relatively coarse inexpensive refractory material to provide a backup. To insure good adherence of the slurry to the pattern, a plasticizer is added to the mix to impart sufficient body to the slurry to provide a viscosity on the order of 10 to 20 seconds Zahn No. 4 Cup Viscometer. As an example, to obtain a 15 second viscosity, approximately 100 grams of the refractory aggregate and plasticizer mixture is combined with about 33.3 ml. of the binder solution. The plasticizers usually employed are very finely divided (−325 mesh) ball clay or kaolin and constitutes about 5%, by weight, of the batch. Other plasticizers well known to those skilled in the art may also be employed.

In invesment molding practices, a prepared slurry of finely divided refractory aggregate and binder is generally poured or sprayed on a master pattern to form the investment. Such practices do not usually necessitate the addition of a plasticizer; however, in order to facilitate removal of the ceramic mold from the master pattern, a gelling agent is added to the batch. Suitable gelling agents are taught in my copending application Ser. No. 325,781, filed Nov. 22, 1963, now United States Patent No. 3,226,784. The suitable gelling agents include organic bases and alkali metal and alkaline earth salts thereof, said organic bases and alkali metal and alkline earth salts thereof being characterized by having from 4 to 22 carbon atoms.

The binder solution is comprised of a lower alkyl silicate, a selected solvent, water and a catalyzer. In this combination, the amount of silica binder, which is added, may provide between about 2 to 30 grams of $SiO_2$ per 100 ml. of the binder solution. There should be no water present in the solution beyond that necessary to completely hydrolize the selected binder, and in the final analysis, must be critically controlled so as to provide a binder solution having substantially no free water hydrolization of the binder.

Thus, in accordance with the invention, workable binder solutions may be made, when there is at least about 60% of the water required for complete hydrolyzation of the organic portion of the silicate binder. As 60% is approached, less satisfactory mixes result. These mixes, however, are quite satisfactory for some less critical casting operations. The preferred ratio of binder to refractory in the batch is between about 1 to 3 and 1 to 5.

Preferably, the proportions of binder ingredients that are utilized herein are those disclosed and claimed in copending application Ser. No. 223,623, filed Sept. 14, 1962, now Patent No. 3,262,792, assigned to a common assignee which is incorporated herein by reference.

Preferred lower alkyl silicate materials are ethyl silicate, ethyl polysilicate and tetraethyl orthosilicate. However, other alkyl silicates or other binders which gel on the addition of alkaline substances can be used to form the slurry.

The solvent which is chosen must be compatible with the binder, and must be sufficiently miscible with water so as to permit complete hydrolysis of the organic radical in the selected binder silicate. The commercial solvent, "Synasol," is particularly satisfactory. "Synasol" is 190 proof ethanol, denature with one gallon of methyl isobutyl ketone, one gallon of ethyl acetate (87%), and one gallon of aviation gasoline per 100 gallons. Other organic solvents, such as 190 to 200 proof methanol and propanol, are also satisfactory.

The catalyzer employed in the binder solution may be such as hydrochloric acid in a quantity sufficient to reduce the pH of the binder solution to the order of 2. In any event, other acid materials may be used, such as sulfuric acid, and in a quantity sufficient to maintain the pH of the binder solution below about 3. When the pH is above 3, the stability of the solution is greatly reduced and premature gellation usually results.

The following example illustrates the teaching of the present invention.

EXAMPLE

An investment molding composition is prepared having as a refractory aggregate zircon flour (−150 mesh Tyler) and South American calcined bauxite. The refractory aggregate is blended with a 10% solution of diethylene-triamine in water and sufficient solution is added to the refractory to provide about 0.1% of the amine based on the weight of the refractory aggregate.

The above mixture is further slurried with 100 grams of prehydrolyzed ethyl silicate in ethyl alcohol and a small amount of hydrochloric acid. The ethyl silicate binder contains about 31% $SiO_2$, by weight. Sufficient water is present to permit about 83% hydrolyzation in the ethyl alcohol. Hydrochloric acid (about 1 cc. per 100 cc.'s of solution) is added to reduce the pH of the solution to about 2.

Zircon itself is substantially chemically balanced so that free silica in the zircon may be overlooked. Therefore, it is necessary to balance only the silica in the binder. Based on the $SiO_2$ content of the binder, about 79 g. of $Al_2O_3$ is required.

If calcined South American bauxite is used containing 89% $Al_2O_3$, and 6.2% $SiO_2$, 15.8% $Al_2O_3$ is already consumed as mullite, leaving 73.2% $Al_2O_3$ free. Thus, 108 g. of bauxite is required.

Therefore, the final slurry will consist of 392 g. 150 mesh zircon, 108 g. 150 mesh calcined South American bauxite, plus 100 g. of prehydrolyzed ethyl silicate, containing 31% $SiO_2$.

Having thus described the invention in detail and with sufficient particularity as to enable those skilled in the art to practice it, what is desired to have protected by Letters Patent is set forth in the following claims.

I claim:

1. In methods of preparing molds for precision casting from batches of refractory grain and a prehydrolized alkyl silicate binder, which batches include free silica, said grain being selected from the group consisting of mullite, sillimanite and zircon, the improvement comprising including South American bauxite in the batch in an amount to provide sufficient free $Al_2O_3$ to react with all the free silica to form mullite.

2. The method of claim 1 in which the free alumina to free silica ratio ranges between 3:1 and 6:1.

References Cited

UNITED STATES PATENTS

| | | | |
|---|---|---|---|
| 3,165,799 | 1/1965 | Watts | 106—38.35 XR |
| 3,226,784 | 1/1966 | Owen et al. | 106—38.35 XR |
| 3,232,771 | 2/1966 | Pearce | 106—38.35 |
| 3,262,792 | 7/1966 | Owen | 106—38.35 |
| 3,326,269 | 6/1967 | Schneider | 106—38.3 XR |

JULIUS FROME, *Primary Examiner.*

L. HAYES, *Assistant Examiner.*